(12) United States Patent
Kiziltas et al.

(10) Patent No.: US 12,012,484 B1
(45) Date of Patent: Jun. 18, 2024

(54) FLEXIBLE POLYURETHANE FOAMS HAVING LOW COMPRESSION SET

(71) Applicant: Ford Global Technologies, LLC, Dearborn, MI (US)

(72) Inventors: Alper Kiziltas, Kars (TR); Owen Li, Dearborn, MI (US); Sandeep Tamrakar, Ann Arbor, MI (US); Deborah Frances Mielewski, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/077,922

(22) Filed: Dec. 8, 2022

(51) Int. Cl.
*C08G 18/00* (2006.01)
*C08G 71/04* (2006.01)
*C08K 3/38* (2006.01)

(52) U.S. Cl.
CPC .............. *C08G 71/04* (2013.01); *C08G 18/00* (2013.01); *C08G 2110/0008* (2021.01); *C08G 2340/00* (2013.01); *C08K 2003/382* (2013.01); *C08K 2201/011* (2013.01)

(58) Field of Classification Search
CPC ........ C08G 2110/00; C08G 2110/0008; C08G 18/00; C08K 2003/382; C08K 2201/011
See application file for complete search history.

(56) References Cited

U.S. PATENT DOCUMENTS

| | | | |
|---|---|---|---|
| 9,868,835 B1 | 1/2018 | Kiziltas et al. | |
| 2006/0178443 A1* | 8/2006 | Boinowitz | C08J 9/0066 |
| | | | 521/99 |
| 2007/0149629 A1* | 6/2007 | Donovan | C08J 9/0061 |
| | | | 521/134 |
| 2015/0359134 A1* | 12/2015 | Soong | H05K 1/0203 |
| | | | 361/720 |
| 2017/0190143 A1* | 7/2017 | Kang | D01D 5/38 |
| 2018/0319926 A1* | 11/2018 | Fregni | C08G 18/7664 |

FOREIGN PATENT DOCUMENTS

| | | | | |
|---|---|---|---|---|
| CN | 109021202 | | 12/2018 | |
| CN | 109021202 A | * | 12/2018 | ......... C08G 18/3228 |
| CN | 111620998 A | * | 9/2020 | ......... C08G 18/3206 |
| CN | 111793190 A | * | 10/2020 | ......... C08G 18/3206 |

OTHER PUBLICATIONS

CN-111620998-A_Sep. 2020_English.*
CN-109021202-A_Dec. 2018_English.*
CN-111793190-A_Oct. 2020_English.*
Joy, et al., An Overview of Boron Nitride Based Polymer Nanocomposites, Journal of Polymer Science, 2020, pp. 3115-3141, vol. 58, Wiley Periodicals LLC.
Shahid, et al., A Critical Review of Phase Change Material Composite Performance Through Figure-of-Merit Analysis: Graphene vs Boron Nitride, Energy Storage Materials, 2021, pp. 365-387, vol. 34, Elsevier.

* cited by examiner

*Primary Examiner* — Michael L Leonard

(74) *Attorney, Agent, or Firm* — Burris Law, PLLC

(57) ABSTRACT

A foam material includes the reaction product of a polyol mixture and an isocyanate mixture and a boron nitride filler in an amount of ≥0.01 wt. % to ≤0.1 wt. %. In various forms, the boron nitride filler is of nanoparticles, is of hexagonal boron nitride, and/or is treated with a silane coupling agent.

14 Claims, No Drawings

FLEXIBLE POLYURETHANE FOAMS HAVING LOW COMPRESSION SET

FIELD

The present disclosure relates to polyurethane foams.

BACKGROUND

The statements in this section merely provide background information related to the present disclosure and may not constitute prior art.

Incorporating additives into polyurethane foams can provide improved mechanical, thermal, and electrical properties to create multifunctional materials.

Conventional methods for manufacturing polyurethane foams typically include reacting a mixture with at least one polyol with hydroxyl groups (such as petroleum-based polyols and also referred to herein as a polyol-containing composition or polyol mixture) with at least one diisocyanate and/or polyisocyanate (also referred to herein as an isocyanate or isocyanate mixture). Additives may also be included, such as blowing agents, surfactants, and catalysts, among others. The mixture of the polyol mixture, the isocyanate mixture, and any additives is also referred to as a reaction mixture or a reaction product. The polyol mixture can include additives, and a gas is formed as a result of the blowing agent, which is typically water, reacting with the isocyanates, thereby forming carbon dioxide and polyurea linkages. Other additives enhance the properties of the resulting foam, control the aforementioned reactions, and the like.

Such foams are used in a variety of automotive applications, as they can form lightweight, flexible, high-resilience, and rigid foams. There is an interest to gravitate towards the use of bio-based (such as soy-based or other, renewable-based) polyols as opposed to petroleum-based polyols, but foams comprised of substantial concentrations bio-based polyols typically have decreased mechanical and physical properties as opposed to foams comprised of substantial concentrations of petroleum-based polyols. For instance, there are challenges in forming bio-based foams, which generally lack in desired wet compression set characteristics.

These issues related to the design and manufacture of renewable-based foams, particularly in automotive applications, are addressed by the present disclosure.

SUMMARY

This section provides a general summary of the disclosure and is not a comprehensive disclosure of its full scope or all of its features.

According to one form of the present disclosure, a foam material includes the reaction product of a polyol mixture and an isocyanate mixture and a boron nitride filler in an amount from greater than or equal to about 0.01 wt. % to less than or equal to about 0.1 wt. %.

In variations of this form, which may be implemented individually or in any combination: the boron nitride filler is hexagonal boron nitride; the boron nitride filler is made up of nanoparticles; the boron nitride filler is treated with a silane coupling agent; the reaction product is a polyurethane material; the polyol mixture is bio-based; the bio-based polyol mixture includes 50 wt. % petroleum based polyol and 50 wt. % bio-based polyol; the foam material is flexible; and a part is formed of the foam material.

According to a second form of the present disclosure, a foam material includes the reaction product of a polyol mixture and an isocyanate mixture and a boron nitride filler in an amount from greater than or equal to about 0.01 wt. % to less than or equal to about 0.1 wt. %, and the boron nitride filler is in the form of nanoparticles. A wet compression set of the foam material is less than or equal to about 13%.

In variations of this form, which may be implemented individually or in any combination: the boron nitride filler is treated with a silane coupling agent; the reaction product is a polyurethane material; the polyol mixture is bio-based; and, the bio-based polyol is 100 wt. % bio-based.

According to a third form of the present disclosure, a foam material includes the reaction product of a polyol mixture and an isocyanate mixture and a boron nitride filler in an amount from 0.01 wt. % to about 0.1 wt. %. The boron nitride filler is in the form of nanoparticles and is treated with a silane coupling agent.

In variations of this form, which may be implemented individually or in any combination: a wet compression set of the foam material is less than or equal to about 13%; the polyol mixture is bio-based; and the reaction product is a polyurethane material.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

As noted above, polyurethane foams are typically prepared by reacting isocyanates with polyols, as described in greater detail below, in the presence of additives. In such a manner, it is contemplated that a polyol mixture according to the present disclosure includes at least one of a petro-based polyol, a bio-based polyol, a $CO_2$-based polyol, mixtures thereof, and any desired additives. Such additives, some of which are optional, include at least one of a cell opener, a surfactant, a cross-linking agent, a catalyst, and a water blowing agent.

Advantageously, either the isocyanate solution or the polyol-containing composition includes a boron nitride filler dispersed therethrough in an amount of greater than or equal to about 0.01 wt. % to less than or equal to about 0.1 wt. %. As described in greater detail below, the boron nitride filler provides improved mechanical and thermal properties, and more particularly with bio-based polyol mixtures.

In one form of the present disclosure, the boron nitride fillers are in the form of nanoparticles. In one variation, the boron nitride fillers are treated with a silane coupling agent. Generally, silane coupling agents modify the surfaces of boron nitride fillers to enhance properties, such as thermal, tribological/electrical, and mechanical properties. In one form of the present disclosure, the boron nitride filler is hexagonal boron nitride.

According to the present disclosure, the boron nitride fillers are added at greater than or equal to about 0.01 wt. % to less than or equal to about 0.1 wt. %, including all sub-ranges of the weight of the foam. In a variation, the boron nitride fillers are added at about 0.3 wt. %.

As used herein, "isocyanates" include diisocyanates such as aromatic diisocyanates, toluene diisocyanates ("TDI"), and methylene diphenyl diisocyanates ("MDI"), as well as polyisocyanates, and mixtures thereof. Non-limiting examples of isocyanates include methylene diphenyl diisocyanate (MDI), toluene diisocyanate (TDI), hexamethylene diisocyanate (HDI), isophorone diisocyanate (IPDI), 4,4'-diisocyanatodicyclohexylmethane (H12MDI), 1,5-naphthalenediisocyanate (NDI), tetramethyllxylenediisocyanate (TMXDI), p-phenylenediisocyanate (PPDI), 1,4-cyclohexane diisocyanate (CDI), tolidine diisocyanate (TODI), and combinations thereof. It is contemplated isocyanates may include polymeric materials.

Polyol-containing compositions, or polyol mixtures according to the present disclosure include at least one of petroleum-based polyols, bio-based polyols, and $CO_2$-polyols, as well as mixtures thereof (e.g., 100% bio-based, 50% petroleum-based and 50% bio-based, or other mixtures not specifically listed here).

As used herein, "petroleum-based polyols" (hereafter "petro-polyol") include polyether polyols by way of not-limiting example, which can be used in the practice of the present disclosure and are well known and widely available commercially. Such polyols are generally at least about 80% by weight or more of a composition or blend of compositions directly or indirectly obtained from a non-renewable resource such as crude oil. In other variations, the polyols are generally at least about 85% by weight, at least 90% by weight, and/or at least 95% by weight or more of a composition or blend of compositions directly or indirectly obtained from a non-renewable resource such as crude oil. Non-limiting examples of the polyether polyols include polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and random and block copolymer glycols prepared from blends or sequential addition of two or more alkylene oxides. The mechanical properties of the resultant polyurethane foam may dictate the consistency of the polyol. More specifically, higher molecular weight polyols generally form more flexible polyurethanes, whereas lower molecular weight polyols generally form more rigid polyurethanes.

As used herein, "bio-based polyols" refer to polyols generally at least about 80% by weight or more of a composition or blend of compositions directly or indirectly obtained from a natural oil. In other embodiments, the polyols are generally at least about 85% by weight, at least 90% by weight, and/or at least 95% by weight or more of a composition or blend of compositions directly or indirectly obtained from a natural oil. Natural oil, as used herein, includes but is not limited to vegetable oils, animal fats, algae oils, tall oils, derivatives of these oils, combinations of any of these oils, and the like. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, pennycress oil, camelina oil, and castor oil. Representative non-limiting examples of animal fats include lard, tallow, poultry fat, yellow grease, and fish oil, as well as polyols made from the bio-based diols 1,3-propanediol (PDO) and 1,4-butanediol (BDO) and diacids, including succinic acid and larger acids such as Elevance's Inherent C18 octadecanedioic acid (ODDA). Representative non-limiting examples of algae oils include microalgae, such as *Nannochloropsis, Spirulina, Chlorella*; algae, such as red algae-Rhodophyta, red algae, *Pithophora oedegonia*, green algae, among others, and combinations thereof.

As used herein, carbon dioxide-based polyols are poly (ether carbonate) polyols (hereafter "$CO_2$-polyol").

Blowing agents assist in preparing foam, and water is highly desirable as a blowing agent. Other blowing agents suitable according to the present disclosure include fluorocarbons, hydrochlorocarbons, chorofluorocarbons, hydrofluorocarbons, hydrocarbons. It is also contemplated that gas may be added directly to the polyol isocyanate reaction mixture to form the foam.

Surfactants are useful for cell nucleation and cell opening in foam applications and offer foam stabilization. One desirable surfactant is TEGOSTAB® B 4690, available from Evonik Degussa, but it is contemplated other nonionic surfactants may be suitable for preparing the polyurethane foams disclosed herein.

Cross-linking agents may be used to improve the cross-linked network, control flexural and other properties of the foam. Suitable cross-linking agents include diethanolamine (DEA) and triethanolamine, which, when used in foam applications, build firmness and increase catalytic activity.

Catalysts enhance the processing characteristics and physical properties of polyurethane foams by promoting the basic chemical reactions between polyol and isocyanate, reactions between water and isocyanate, and reactions to trimerizate isocyanates. Catalysts may be selected according to the needs of a particular application, for example, to improve the polyether foaming process of a wide variety of foams, including high-density unfilled foam, filled foam, high load-bearing flexible foam, low-density foam, and high resilience molded foam. Other catalysts may be selected to delay the foam-forming reaction process, which can result in more open foam structures. Suitable catalysts according to the present disclosure are dibutyltin dilaurate (DBTDL) and diluted amine ethers. Tertiary amines may be desirable as catalysts when water is present in the polyol isocyanate reaction mixture, as it catalyzes the isocyanate to react with water to form urea linkages with urethane. According to a form, the catalyst may comprise a first catalyst comprised of a diluted amine ether, and a second catalyst comprised of a water-soluble tertiary amine.

Cell openers may be used to prepare foam structures that have predominantly open cells, which gives it a larger value of air permeability and include water-soluble emulsifiers.

Other optional additives include buffers, dendritic macromolecules, inorganic particulates, other types of polyols not listed herein, polyisocyanates, flame retardants, deodorants, colorants, fillers, combinations thereof, and other additives known to those familiar with the technology and as specific application requirements dictate.

Test Data

Various polyol-based foam compositions having differing concentrations of treated boron nitride fillers and untreated boron nitride fillers were prepared and tested according to the teachings of the present disclosure. Control polyol-based foam compositions having no boron nitride fillers were also prepared and tested.

The working examples were produced according to the following procedure. First, a polyol mixture was formed by mixing together up to about 100 wt. % of a polyol-containing composition, cell opener, surfactant, cross-linking agent, a catalyst, and boron nitride fillers were added and mixed with an overhead laboratory mixer at 2000 rpm for about three minutes. An isocyanate was added to the polyol mixture and mixed with a handheld mixer for about 12 seconds. The reaction mixture was poured into a closed mold system that had been coated with a release agent and warmed in a pre-heated oven at about 65° C. for about 15 minutes. Each foam was able to rise within the mold and demolding time was about 7 minutes and upon release from the mold, was crushed by hand to release trapped gases. Each foam was placed in a pre-heated oven at about 60° C. for about 30 minutes and subsequently removed from the oven and then at room temperature for a minimum of about 12 hours to allow for curing. The working examples were produced in quintuplicate.

The resultant foams of the working examples had their wet compression tested according to ASTM 3574-08 (Tests D and L). More specifically, the thicknesses of the working samples were measured, then the working samples were clamped between metal plates at nominal (50%) compression and placed in an environmental chamber at 50° C. and 95% relative humidity for 22 hours. The working samples were removed and allowed to recover at room temperature and humidity for greater than or equal to about 30 minutes to less than or equal to about 40 minutes. The resulting thicknesses were measured and compared.

Table 1 shows the results of the respective tests.

TABLE 1

| BN Filler Type | Example 1 Wet Com. Set (%) | Example 2 Wet Com. Set (%) | Example 3 Wet Com. Set (%) | Example 4 Wet Com. Set (%) | Example 5 Wet Com. Set (%) | Average Wet Com. Set (%) |
|---|---|---|---|---|---|---|
| 0% untreated | 13.415 | 13.253 | 14.683 | 14.516 | 15.726 | 14.318 |
| .01% untreated | 9.796 | 10.040 | 10.526 | 10.757 | 12.602 | 10.744 |
| 0.25% untreated | 12.851 | 11.741 | 11.647 | 12.448 | 13.169 | 12.371 |
| 0.05% untreated | 9.677 | 9.717 | 9.200 | 10.484 | 10.700 | 9.955 |
| 0.1% untreated | 12.048 | 9.877 | 11.245 | 9.486 | 15.234 | 11.578 |
| 0.01% treated | 11.508 | 10.931 | 11.952 | 11.155 | 12.146 | 11.538 |
| 0.25% treated | 12.097 | 12.302 | 10.359 | 10.526 | 12.450 | 11.547 |
| 0.05% treated | 11.523 | 10.526 | 10.887 | 10.400 | 12.851 | 11.237 |
| .1% treated | 12.851 | 11.789 | 11.741 | 12.549 | 12.757 | 12.337 |

More specifically, foams prepared according to conventional methods exhibited wet compression ranging from greater than or equal to about 13% or less than or equal to about 15.5%. Foams prepared according to the scope of the present disclosure, however, exhibited wet compression of less than or equal to about 13%, aside from one working example having untreated boron nitride filler at 0.25 wt. % and 0.1 wt. %.

Lower compression set values are consistent with foams that better maintain their initial shape after deforming due to compression and accordingly are highly relevant in the context of interior and seating automobile applications. Thus, the polyurethane foams disclosed hereunder may be used in various applications where it is desirable to have such properties. Further, the polyurethane foams disclosed hereunder may be used in various automotive applications and for vehicle components, including but not limited to seat backs, seat cushions, armrests, headliners, engine covers, and instrument panels.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A foam material comprising the reaction product of a polyol mixture and an isocyanate mixture, and a boron nitride filler in an amount from 0.01 wt. % to less than 0.1 wt. %, the polyol mixture being bio-based,
wherein a wet compression set of the foam material is less than about 13%.

2. The foam material according to claim 1, wherein the boron nitride filler is hexagonal boron nitride.

3. The foam material according to claim 1, wherein the boron nitride filler consists of nanoparticles.

4. The foam material according to claim 1, wherein the boron nitride filler is treated with a silane coupling agent.

5. The foam material according to claim 1, wherein the reaction product is a polyurethane material.

6. The foam material according to claim 1, wherein the bio-based polyol mixture comprises 50 wt. % petroleum-based polyol and 50 wt. % bio-based polyol.

7. The foam material according to claim 1, wherein the bio-based polyol mixture is 100 wt. % bio-based.

8. The foam material according to claim 1, wherein the foam material is flexible.

9. A part comprising the foam material according to claim 1.

10. A foam material comprising the reaction product of a polyol mixture and an isocyanate mixture, and a boron nitride filler in an amount from 0.01 wt. % to about 0.1 wt. %, the boron nitride filler being in the form of nanoparticles, the polyol mixture being bio-based, wherein a wet compression set of the foam material is less than about 13%.

11. The foam material according to claim 10, wherein the boron nitride is treated with a silane coupling agent.

12. The foam material according to claim 10, wherein the reaction product is a polyurethane material.

13. A foam material comprising:
   the reaction product of a polyol mixture and an isocyanate mixture; and
   a boron nitride filler in an amount from 0.01 wt. % to about 0.1 wt. %, the boron nitride filler being in the form of nanoparticles and treated with a silane coupling agent, the polyol mixture being bio-based,
   wherein a wet compression set of the foam material is less than about 13%.

14. The foam material according to claim 13, wherein the reaction product is a polyurethane material.

* * * * *